F. GRAY.
TELEPHONOMETER.
APPLICATION FILED FEB. 19, 1918.
1,281,944.  Patented Oct. 15, 1918.
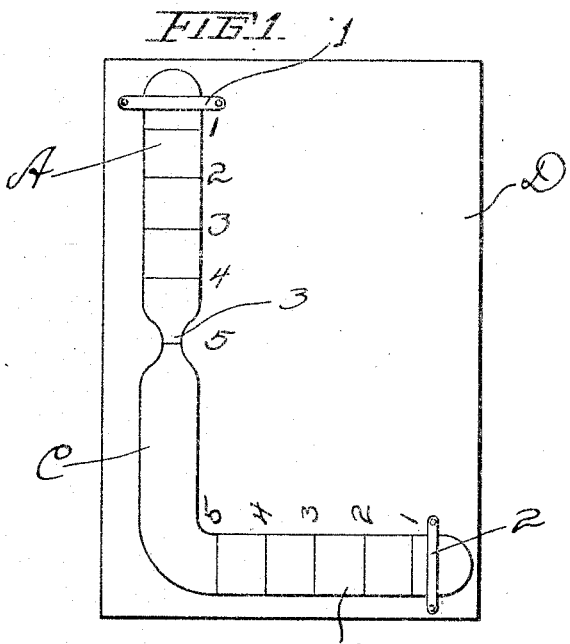
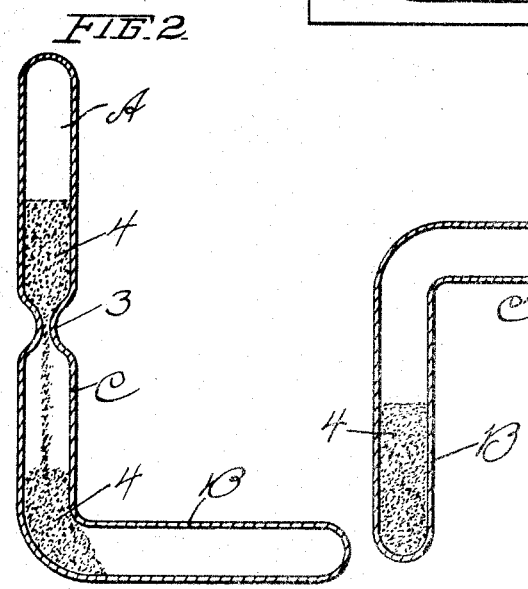
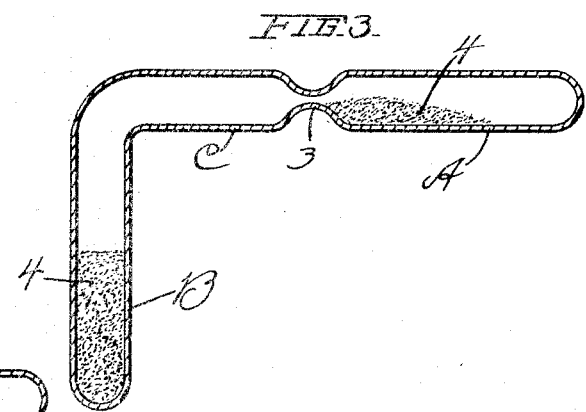
Witness
John E. Melton.
Inventor
Frank Gray,
By A. L. Jackson
Attorney

UNITED STATES PATENT OFFICE.

FRANK GRAY, OF FORT WORTH, TEXAS.

TELEPHONOMETER.

1,281,944.  Specification of Letters Patent.  Patented Oct. 15, 1918.

Application filed February 19, 1918. Serial No. 218,068.

*To all whom it may concern:*

Be it known that I, FRANK GRAY, a citizen of the United States of America, residing at Fort Worth, in the county of Tarrant and State of Texas, have invented certain new and useful Improvements in Telephonometers, of which the following is a specification.

My invention relates to meters and more particularly to telephonometers; and the object is to provide a simple manner of measuring the time a telephone is in use; and to provide a simple and inexpensive device for the use of patrons of telephones. The advantage is that a patron can keep his own record and a correct record of the use of his telephone. Other objects and advantages will be fully explained in the following description and the invention will be more particularly pointed out in the claims.

Reference is had to the accompanying drawings which form a part of this application.

Figure 1 is an elevation of the invention. Fig. 2 is a vertical section of the tube, showing the position of the measuring element in action. Fig. 3 is a similar view turned to shift the part of the element which has measured a period of time for the purpose of retaining a record of the time.

Similar characters of reference are used to indicate the same parts throughout the several views.

This invention includes a closed tube, preferably of transparent material. The tube is provided with a graduated measuring end A and a graduated record end B, and an intermediate containing portion C. The ends A and B have scales of minutes, lines being marked or made across the tubes and the numerals 1, 2, 3, 4, and 5, placed at appropriate places to note the number of minutes. It is apparent that the numbers may be placed on the tubes or on the carrier D. A carrier D may be provided, if desired, and the instrument attached thereto by clips 1 and 2. The portions A and C are separated by a constricted portion or neck 3 through which the measuring element must or will pass. The measuring element 4 may be sand or ground emery or other suitable material.

The telephonometer is an instrument for measuring the duration of a conversation over a local or long distance telephone line, and particularly in long distance conversations in which there may be an interruption, or interruptions, so that in estimating the time consumed in any conversation, only the time when the telephone was in actual use may be measured.

For measuring the time a person is talking, hold the instrument with the part A in upright or vertical position with all of the measuring element in that part of the instrument. As a person talks, the element 4 will gradually run through the constricted portion 3 and bring the top line or top surface of the measuring element down and the scale will show how many minutes or parts of minutes a person has talked. The falling material will accumulate in the part C and partly in the part B. When a person has finished talking, turn the instrument to the position shown in Fig. 3. This portion B will show the same measurement and preserve the measurement. If, while a person is talking, there is an interruption, as frequently occurs through fault or failure or disturbance of the lines, the instrument can be turned to horizontal position to stop the flow of the measuring element, and then turned back to vertical position as soon as the conversation can be continued and thus measure properly or accurately the length of time the person has talked or the length of time the conversation lasted. The constricted portion 3 will effectually prevent the passage of the measuring element whenever the part A is turned to horizontal position.

It is apparent that the parts of the instrument may be made of different lengths and sizes without departing from my invention.

What I claim is,—

1. A telephonometer comprising a tubular member and a measuring element therein and a tubular measuring and record preserving member operatively connected to and disposed at a right angle to said measuring member.

2. A telephonometer comprising a tubular member, a measuring element therein and easily movable therefrom, and a tubular measuring and record preserving member in communication with and disposed at a right angle to said first named tubular member.

3. A telephonometer comprising a bent sealed tube and a measuring element easily movable therein, said tube having a graduated measuring member, a graduated record preserving member disposed at right angles to said measuring member, and a receiving and shifting member in communication with the other two members.

4. A telephonometer comprising a bent sealed tube and a measuring element easily movable therein, said tube having a graduated measuring member and record preserving member disposed at right angles to said measuring member and a constricted portion separating and connecting said members and controlling the passing of said measuring element from said measuring member to said record preserving member.

5. A telephonometer comprising a sealed receptacle of transparent material having a graduated measuring member, a graduated record preserving member at an angle of less than 180 degrees to said measuring member, a measuring element movable from one member of the receptacle to the other, and a constricted portion connecting the two members of said receptacle and regulating the passage of said measuring element from one member to the other.

6. A telephonometer having means for measuring the time of use of a telephone consisting of a bent sealed tubular measuring member and a mobile measuring element therein, a sealed tubular record preserving member disposed at right angles to said measuring member, and a constricted portion connecting said members and adapted to control the passage of said mobile measuring element from one member to the other.

In testimony whereof I set my hand this 14th day of February, 1918.

FRANK GRAY.

Copies of this patent may be obtained for five cents each, by addressing the "Commissioner of Patents, Washington, D. C."